United States Patent [19]

Prvanoff

[11] Patent Number: 4,521,048

[45] Date of Patent: Jun. 4, 1985

[54] VEHICLE SUPPORTED COLLAPSIBLE BED WITH SHELTER COVER

[76] Inventor: Ivan Prvanoff, 8786 Evangeline, Dearborn Heights, Mich. 48127

[21] Appl. No.: 452,138

[22] Filed: Dec. 22, 1982

[51] Int. Cl.³ .............................................. B60P 3/34
[52] U.S. Cl. .................................. 296/160; 296/174; 135/88; 160/229 R; 16/250
[58] Field of Search ........................ 296/156, 159–161, 296/169, 173, 174, 165; 135/88, 901; 160/229 R, 20, 231 A, 201, 21; 224/328, 329; 16/250, 251

[56] References Cited

U.S. PATENT DOCUMENTS

| 2,099,122 | 11/1937 | Kreisler | 160/229 R |
|---|---|---|---|
| 2,301,089 | 11/1942 | Stevens | 135/901 |
| 2,585,976 | 2/1952 | Teeter | 296/191 |
| 3,102,546 | 9/1963 | Guerrant | 135/88 |
| 3,302,690 | 2/1967 | Hurd | 160/201 |
| 3,319,697 | 5/1967 | Krohn | 160/229 R |
| 3,362,745 | 1/1968 | Flajole | 296/173 |
| 3,920,288 | 11/1975 | Ito | 160/202 |
| 4,111,479 | 9/1978 | Rizzotto, Sr. | 296/160 |
| 4,271,856 | 6/1981 | Ferguson | 135/88 |
| 4,310,195 | 1/1982 | Huff | 296/173 |

FOREIGN PATENT DOCUMENTS

| 73853 | 10/1944 | Czechoslovakia | 224/329 |
|---|---|---|---|
| 0040108 | 11/1981 | European Pat. Off. | 296/173 |
| 98624 | 7/1961 | Netherlands | 296/169 |
| 1070981 | 6/1967 | United Kingdom | 296/161 |
| 1502473 | 3/1978 | United Kingdom | 296/159 |

Primary Examiner—David A. Scherbel
Assistant Examiner—Dennis H. Pedder
Attorney, Agent, or Firm—Cullen, Sloman, Cantor, Grauer, Scott & Rutherford

[57] ABSTRACT

Vehicle supported collapsible bed with a shelter cover comprises a pair of spaced upright center sections upon a support panel overlying and secured to the vehicle roof, and longitudinally spaced pairs of upright end sections at their ends pivotally mounted and supported upon the ends of the center sections. Support panels underlie and span the end sections and are in aligment with the support panel, for supporting a plurality of mattress sections. An elongated flexible sheet underlies the support panels and is secured thereto. The end sections are adapted to rotate approximately 180° about their pivotal mountings into registry with the center sections and with the ends of the flexible sheet overlying the center sections and with the sheet extending around and enclosing the pivot ends of the center and end sections. A shelter framework overlies the support panels and includes depending corner uprights at their ends removably nested within sockets upon the end sections. A hollow shelter of flexible material encloses, is supported upon the framework and extends to the center and end sections.

10 Claims, 9 Drawing Figures

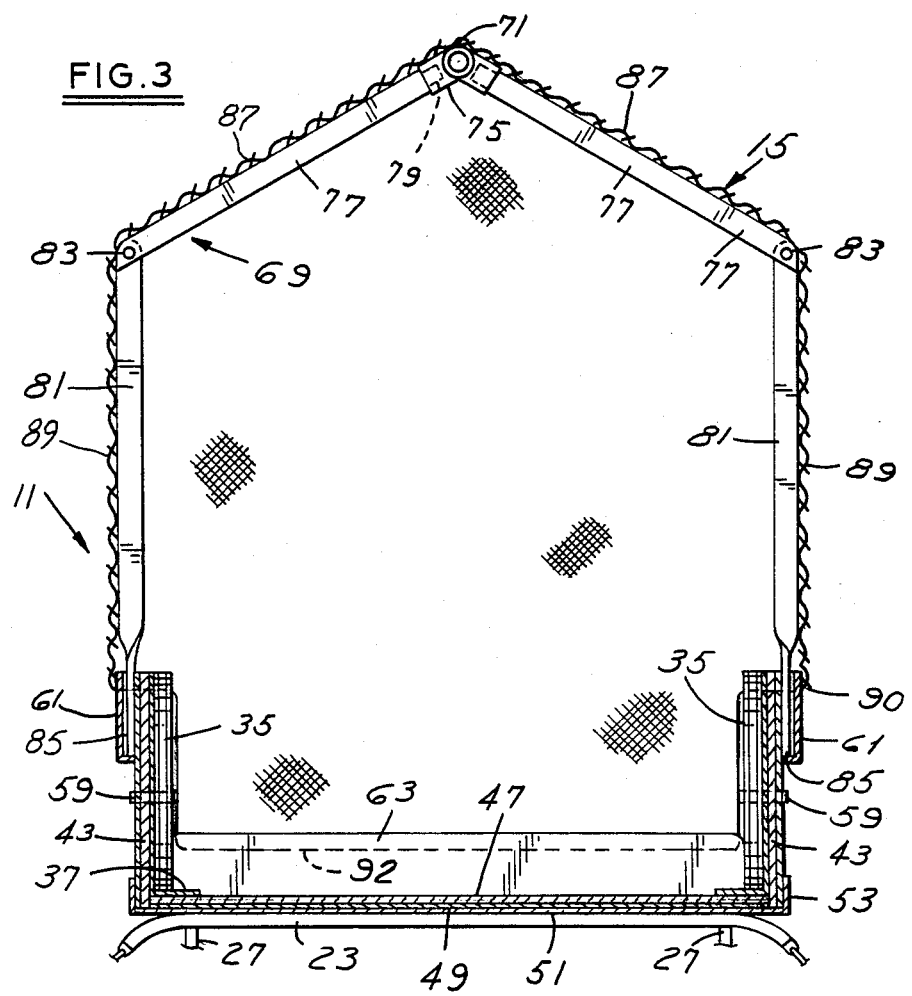
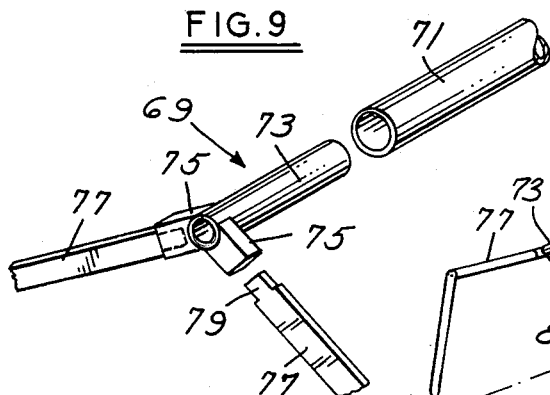
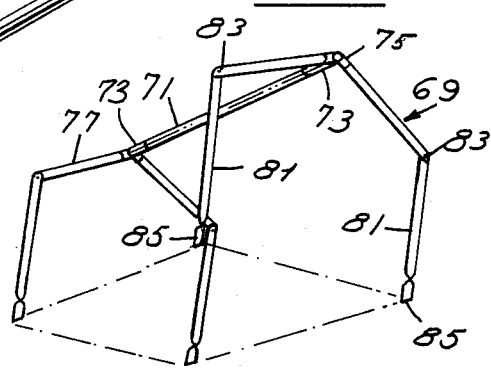

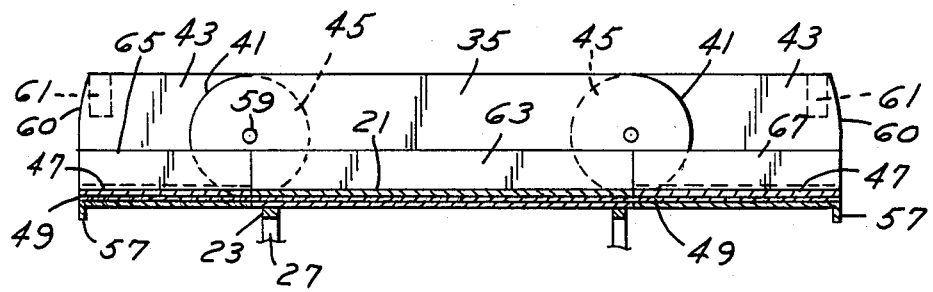
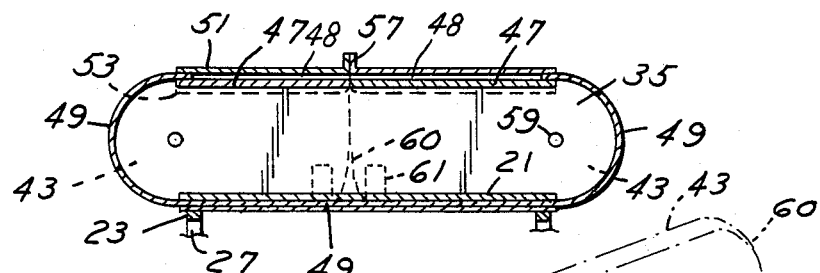
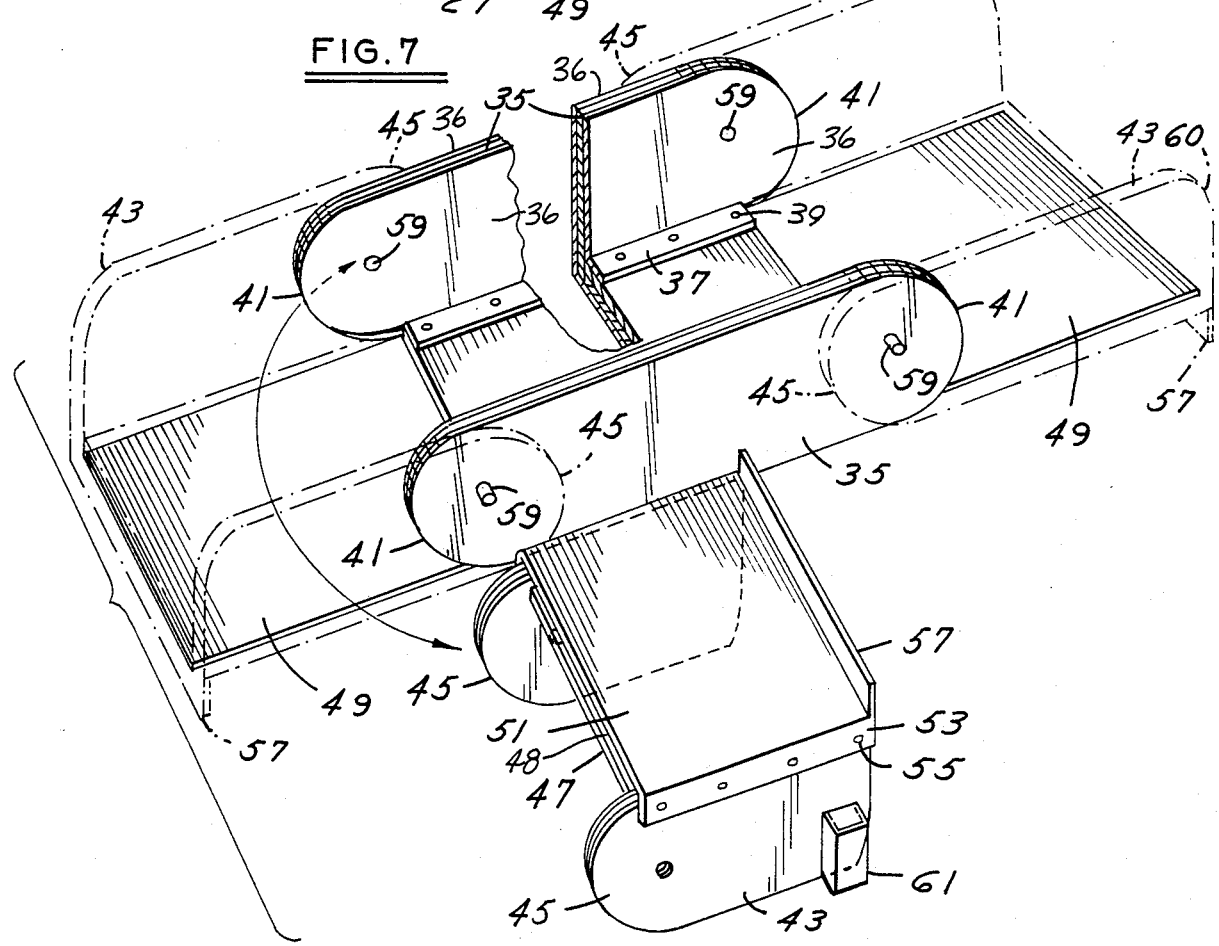

4,521,048

VEHICLE SUPPORTED COLLAPSIBLE BED WITH SHELTER COVER

BACKGROUND OF THE INVENTION

Campers with flexible tent coverings have been mounted upon vehicle roofs, with the support panels for the mattresses and bedding extending outwardly of the vehicle profile. In such constructions involved linkages and framework are employed providing for the collapse of the campers when not in use and for portability upon the vehicle roofs.

Various difficulties have been encountered in such a vehicle supported camper primarily due to the difficulty of anchoring the camper upon the vehicle roof, the difficulties presented by the camper profile extending outwardly of the vehicle body and presenting an impact danger as to passing vehicles and the difficulties of erecting and collapsing such a camper.

Vehicle supported collapsible beds or enclosures are disclosed in the prior art. Each enclosure provides an extension of the trunk compartment or rear end of the vehicle and normally extends rearwardly of the vehicle when in use. In certain instances the enclosures in part rest upon the ground or form an extension of the vehicle body. None of the prior art patents utilizes a structure which is mounted on and within the contour of the vehicle roof.

SUMMARY OF THE INVENTION

An important feature of the present invention is to provide a vehicle supported collapsible bed with a flexible shelter cover thereon which is supportably mounted upon and overlies the vehicle roof and portends an area within the contour of the vehicle.

A further feature includes a collapsible bed adapted for mounting upon a vehicle roof including upright center sections and longitudinally spaced pairs of upright end sections at their one ends pivotally connected to the center sections and wherein each of the sections have across the bottom thereof horizontal support panels adapted to mount mattress sections. The pivotal mountings of the end sections provide a means by which the end sections may be rotated approximately 180° into registry with the center sections for collapsing the bed when not in use.

A further feature includes the use of an elongated flexible sheet which underlies the support panels of the respective sections and is suitably secured thereto so that upon rotational collapse of the end sections, the flexible sheet will extend around and enclose the pivot ends of the center and end sections of the collapsible bed.

A further important feature contemplates the use of a collapsible framework which includes a plurality of corner posts whose lower ends are removably nested within sockets at the corners of the end sections.

A further feature incorporates the use of a shelter cover in the form of a tent like hollow enclosure normally stored in the collapsed bed and adapted to be supportably positioned over the framework and which extends down to the corresponding center and end sections.

These and other features will be seen from the following Specification and claims in conjunction with the appended drawings.

THE DRAWINGS

FIG. 3 is a front end elevational view of the bed and shelter cover taken in the direction of arrows 3—3 of FIG. 1, and on an increased scale.

FIG. 5 is a longitudinal section illustrative of the end sections in a use position with respect to the center sections of the collapsible bed shown in FIG. 1.

FIG. 6 is a similar view illustrating the collapsed end sections with respect to the center sections.

FIG. 7 is a fragmentary partly broken away perspective view showing the end sections in collapsed position with the horizontal end supports omitted for clarity and with the flexible sheet shown in a fully opened position, a portion of FIG. 7 as bracketed including one of the end sections having mounted thereon a flanged cover.

FIG. 8 is a fragmentary perspective view of the shelter framework shown on a reduced scale with respect to FIG. 3.

FIG. 9 is a fragmentary perspective view of a portion of the framework shown in FIG. 8 with the ridge pole including a telescoping section.

It will be understood that the above drawings illustrate merely a preferred embodiment of the invention, and that other embodiments are contemplated within the scope of the claims hereinafter set forth.

DETAILED DESCRIPTION OF AN EMBODIMENT OF THE INVENTION

Figure 1:
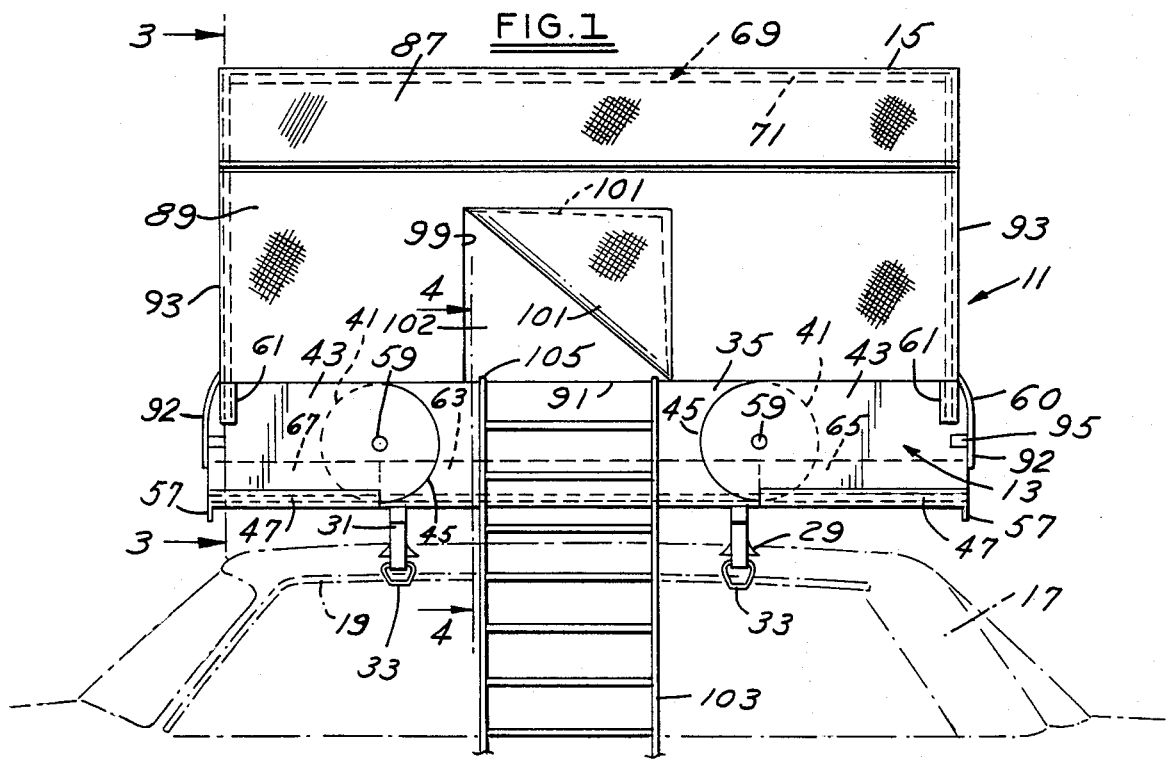
FIG. 1 is a side elevational view of the present vehicle supported collapsible bed with shelter cover as mounted upon the roof of a vehicle, fragmentarily shown.

Referring to the drawings, FIGS. 1 through 9, the present vehicle supported collapsible bed with shelter cover is generally indicated at 11 in FIGS. 1 and 3 and includes a collapsible bed or bed assembly 13 and a flexible shelter cover 15 preferably constructed of canvas for illustration. The present collapsible bed with shelter cover 11 is adapted for mounting and support upon vehicle roof 17, fragmentarily shown in dash lines in FIGS. 1 and 2 having upon and along its opposite side edges the conventional drain rails 19.

The present collapsible bed 13 has an open position and a collapsed position and includes a horizontal support panel 21, preferably constructed of wood, which is spaced above and suitably supported upon vehicle roof 17. In the illustrative embodiment, the support panel 21 is mounted upon the vehicle roof carrier shown in FIGS. 1, 2, 3 and 4. The roof carrier includes a pair of longitudinally spaced cross supports 23 for mounting the horizontal support panel 21 which extends longitudinally of the vehicle roof 17 within its contour and which may be secured to the cross supports 23 as by fasteners 25, for illustration, FIG. 4.

Each of the cross supports 23 has a pair of laterally spaced depending legs 27 which terminate in conventional suction cups 29 adapted for cooperative securing registry with the vehicle roof 17. In the illustrative roof carrier, each of the cross supports 23 at its ends have elastic straps 31 which terminate in hooks 33 adapted for interlocking retaining engagement with the corresponding drain rails 19 for securing the carrier to the roof 17.

The roof carrier is of a conventional construction available on the market and provides a means by which the present collapsible bed 13 is supported and secured upon the vehicle roof 17.

Figure 4:
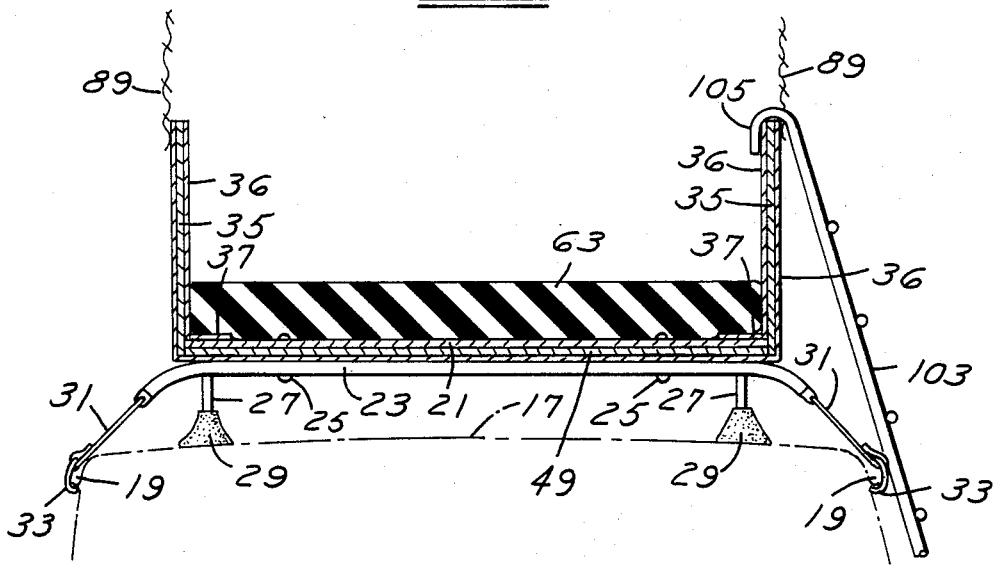
FIG. 4 is a fragmentary section taken in the direction of arrows 4—4 of FIG. 1.

The present collapsible bed 13 includes a pair of laterally spaced upright center sections 35 having an aluminum skin or cover layer 36 thereon, FIG. 4. Each of the center sections 35 at its lower edges has an inwardly directed mount flange 37 which extends along the outer edges of the support panel 21 and is secured thereto by a plurality of fasteners 39, FIG. 7. The ends of the center sections 35 are semi-circular as shown at 41.

Longitudinally spaced pairs of laterally spaced upright end sections 43, shown in FIG. 1, have semi-circular ends 45 which bear against the outer ends of the center sections 35 and are pivotally mounted thereon by the plurality of pivot pins 59. The pins 59 are mounted upon end portions of the center sections 35 and project transversely outward and extend through the corresponding circular end portions of the end sections 43. This provides a means of pivotally mounting and supporting the pairs of end sections 43 upon the center sections 35. With such a construction the pivot pins 59 extend through the corresponding center sections 35 and the end sections 43.

Horizontal end support panels 47, preferably constructed of wood, for illustration, span each of the pairs of end sections 43 and are secured to the undersides thereof. The end support panels 47 are coplanar with the horizontal support panel 21 and form an extension thereof when the collapsible bed 13 is in the open position as shown in FIGS. 1 and 5. With such a construction the end sections 43 extend longitudinally outwardly from and thereby constitute extension of the center section 35.

Suitable aluminim skin or other protective coverings 36 are applied and secured to the surfaces of the center sections 35 as shown in FIG. 4. In the illustrative embodiment, and as shown in FIG. 6 and in the exploded portion of FIG. 7, each of the metallic covers 51 overlie the end support panels 47 and include an upright side flanges 53. These bear against adjacent surface portions of the respective end sections 43 and are secured thereto by a plurality of fasteners 55.

Each of the covers 51 include across their inner edges the transverse flange 57, which in the opened form of the bed assembly 13, FIG. 7 is shown depending from the respective ends of the bed. The flanges 57 function as stop flanges and to facilitate manual rotation of the corresponding end sections 43, which are adapted to rotate approximately 180° from the position shown in FIG. 5 to the position shown in FIG. 6 and wherein the stop flanges 57 are in operative engaging relation. The covers 51 overlie the end sections 43, with the flanges 57 extending upright as shown in FIG. 6 in snug sealing engagement. With such a construction the end support panels 47 after rotation are in alignment and engaging registry as shown in FIG. 6. The abutting panels 47 overlie and are spaced from the horizontal support panel 21.

Elongated flexible sheet 49, which may be of plastic, or of aluminum extends along the undersurfaces of the horizontal support panel 21 and the end support panels 47. The sheet 49 has an intermediate or center portion and a pair of bendable end portions. The intermediate portion of the flexible sheet 49 is suitably secured to the undersurface of the horizontal support panel 21 and corresponding bendable end portions of the sheet 49 are secured to lower edge portions of the corresponding end sections 43.

Accordingly, when the end sections 43 are rotated manually about their pivot connections 59 with the center sections 35 such as to the enclosed collapsed position shown in FIG. 6, corresponding bendable end portions of the flexible sheet 49 are in cooperative engagement with and extend around the corresponding semi-circular ends 41 of the center sections and the corresponding semi-circular ends 45 of the end sections 43. The metallic cover 51 and the support panel 47 are spaced apart to form a storage space 48, see FIG. 6, to completely receive the bendable end portion of the flexible sheet 49 as the collapsible bed 13 is opened, see FIG. 5. When the collapsible bed is folded to the collapsed position, cover 51 and panel 47 slide with respect to the bendable end portion exposing the bendable end portion and allowing the bendable end portion to extend around circular ends 41 and circular ends 45. This provides a closure for the end sections 43 when they have been rotated to the collapsed arrangement shown in FIG. 6.

Figure 2:
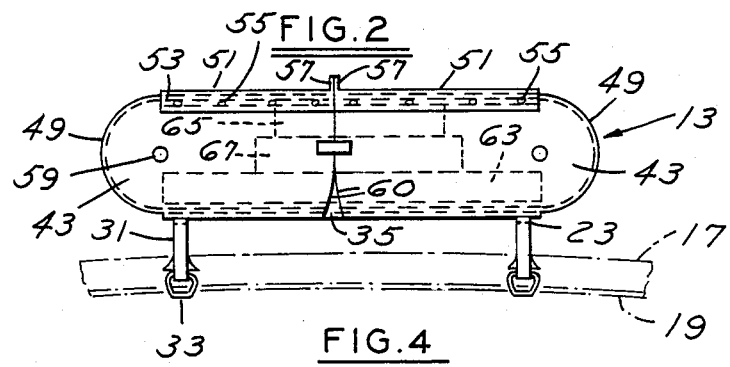
FIG. 2 is a similar side elevational view with the bed collapsed and the shelter cover removed.

As shown in FIG. 7 and FIG. 5, ends of the end sections 43 opposite their semi-circular ends 45 are substantially upright and straight so that upon rotation of the end sections to the collapsed position shown in FIGS. 2 and 6, the edges 60 are in substantial engaging registry and the end sections 43 respectively are in longitudinal alignment.

As shown in FIGS. 1 and 5, upwardly opening sockets 61 are mounted upon outer end portions of the respective end sections 43 and provide a means of mounting and supporting the framework 69, FIG. 3 for the shelter cover 15 having panels 87, 89 and 93.

Suitable mattresses 63, 65 and 67 of a foam material, such as sponge rubber or sponge plastic are so dimensioned as to be mounted in alignment upon the respective horizontal support panel 21 and end support panels 47 when the bed is in the open position shown in FIGS. 1 and 5. The mattresses 63, 65 and 67 are stacked as shown in dash lines in FIG. 2, when the corresponding end sections 43 are pivoted approximately at 180° around the respective pivot axes 59 to the collapsed enclosing position.

The shelter framework 69, shown in detail in FIGS. 3, 8 and 9, includes the horizontal ridge pole 71, being a tube which has adjacent each end thereof a telescoping extension 73. Extending from the respective ends of the ridge pole 71 and including the telescoping extension 73 are a pair of longitudinally spaced downwardly inclined sockets 75 which are affixed to the ridge pole and extension at the outer ends thereof.

The shelter framework 69 includes longitudinally spaced pairs of downwardly inclined end rails 77 having end fitting 79 of reduced dimension which are removably and frictionally projected and snugly nested within the corresponding sockets 75 upon assembly in FIGS. 3, 8 and 9. Their other ends are pivotally connected as by pivot pins 83 to the corresponding corner uprights 81.

In the illustrative embodiment and as best shown in FIGS. 3 and 8, the corner uprights 81 at the ends of the framework 69 are substantially coplanar and are pivotally mounted upon axes corresponding to pivot pins 83. The lower ends of the corner uprights 81 are twisted 90° defining the mount sections 85 which are adapted for interlocking nesting and assembly within the corresponding sockets 61 shown in FIG. 3.

This provides a rigid, but collapsible mounting for the roof shelter cover 15. The cover 15 includes the roof cover panels 87, sides or side panels 89 and ends or end panels 93, as shown in FIGS. 1 and 3. The corners are preferably constructed of canvas or other flexible material which is waterproof and which overlies and snugly encloses shelter framework 69. The shelter cover 15 includes the connected downwardly inclined roof panels or elements 87 which extend from the ridge pole 71 and which terminate in the depending side panels 89 whose lower edges 91 extend past and overlap the corresponding upper edge portions of the corresponding center and end sections 35 and 43, FIGS. 1 and 3.

The corresponding end panels 93, FIG. 3 of the shelter extend below the lower edges 90 of the side panels 89 of the shelter so as to enclose the open ends of the respective end sections 43. The corresponding end sections or end panels 93 of the canvas shelter cover 15 have the lower edges 92 secured and anchored as at 95, FIG. 1, by suitable snaps, tape, fasteners or Velcro, such as will retain the complete shelter over the framework 69 when assembled against the forces of the wind or natural elements. The corresponding edges 90 of the shelter cover 15 are similarly anchored or secured to corresponding side portions of the end and center sections 43 and 35.

The shelter framework 69, after the uprights 81 are removed from the sockets 61 of the bed assembly 13, may be disassembled or collapsed for storage and located within the center and end sections 35 and 43.

In the illustrative embodiment, FIG. 1, one side 89 of the shelter has a vertical slit 99 for defining the closure flap 101 which when partly folded, as shown in dash lines 101, provides an entrant opening 102 which may be closed by lowering the folded portion of the flap 101.

There is provided a ladder 103, FIGS. 1 and 4, constructed of aluminum tubing, for illustration, which rests upon the ground and which has at its upper end a pair of reverse turned hooks 105 which extend around the upper edge of the center section 35. The ladder 103 can be withdrawn into the shelter after the occupants have climbed therein.

The construction and dimension of the respective collapsible bed assembly 13 and shelter cover 15 are such that the entire assembly is mounted above the vehicle roof 17, but within the contour thereof so that there are no projections thereof which extend beyond the body of the vehicle.

No stakes or ropes are needed to utilize the present shelter. The camper will hold bed linen, blankets, pillows or sleeping bags along with the mattresses. The self-storing ladder allows a person to set up or take down the camper in a few minutes. The user can then sleep off the ground, above the car and away from insects and animals. The present collapsible bed 13 and shelter cover 15 can accommodate two adults and possibly one child. When not in use the shelter covers 87, 89 and 93 are stored within the collapsed bed assembly 13 shown in FIG. 2.

Having described my invention, reference should now be made to the following claims:

I claim:

1. A collapsible bed adapted for mounting upon a vehicle roof and having an open position and a collapsed position comprising;

a horizontal center support panel overlying and secured to the roof;

a pair of laterally spaced upright center sections mounted and secured upon said support panel along its sides;

longitudinally spaced pairs of laterally spaced upright end sections;

each pair of end sections respectively bearing against one of the ends of said center sections, with the one ends of each pair of end sections being pivotally mounted and supported upon one of the ends of said center sections respectively, and extending longitudinally outward as extensions thereof when said bed is in said open position;

a horizontal end support panel spanning each of said pairs of end sections and secured to the undersides thereof, coplanar with said horizontal support panel, forming an extension thereof when said bed is in said open position;

said horizontal end support panel having a storage space associated therewith;

said center and end support panels respectively adapted to mount thereon corresponding mattress sections;

and an elongated flexible sheet having an intermediate portion and a pair of end portions, said intermediate portion underlying and secured to the undersurface of said horizontal center support panel in both of said positions and the end portions of said flexible sheet being received within said storage space when said bed is in said open position and extending around said end sections when said bed is in a collapsed position;

said end sections and corresponding end support panels adapted to rotate approximately 180 degrees about their pivotal mountings into registry with said center sections when said bed is in a collapsed position;

and with the corresponding end portions of said flexible sheet overlying and spanning said center sections, the end portions of said flexible sheet not received within said storage space extending around and enclosing the pivot ends of said center and end sections.

2. In the collapsible bed of claim 1, the pivot ends of said center sections and end sections being semicircular;

said sheet on said rotation of said end sections and when the bed is in the collapsed position spanning and extending around the registering semicircular ends of said end and center sections.

3. In the collapsible bed of claim 1, the pivot mounting of said end sections including transverse pivot pins mounted upon and extending through said center sections adjacent their ends and through said end sections.

4. In the collapsible bed of claim 1, said end support panels after said rotation being in alignment and engaging registry, overlying and spaced from said horizontal support panel when the bed is in the collapsed position.

5. In the collapsible bed of claim 1, a cover secured upon each horizontal end support panel, each cover terminating in a depending transverse flange, whereby upon the rotation of said end sections, said covers overlie said sections with said flanges extending upright in a snug sealing engagement;

said transverse end flanges facilitating manual rotation of said end section.

6. In the collapsible bed of claim 5, each of said covers having upright side flanges extending over the corresponding edges of said end sections and secured thereto.

7. In the collapsible bed of claim 1, upwardly opening sockets secured upon the other ends of said end sections, corresponding to the corners of said end support panels;

an upright shelter framework overlying said support panels and including depending corner uprights at their ends projected into said sockets;

and a hollow shelter cover of flexible material snugly enclosing and supportably mounted upon said framework with its sides and ends depending so as to overlap said center and end sections.

8. In the collapsible bed of claim 7, said framework further including a central horizontal ridge pole, and spaced pairs of opposed downwardly inclined end rails at their one ends removably secured to the ends of said pole and at their other ends pivotally connected to said corner uprights.

9. In the collapsible bed of claim 8, said ridge pole including a pair of telescoping sections.

10. In the collapsible bed of claim 8, spaced pairs of downwardly inclined rail sockets secured upon the ends of said ridge pole;

said one ends of said end rails being snugly nested within said rail sockets.

* * * * *